United States Patent
Bortner et al.

(10) Patent No.: US 11,510,369 B2
(45) Date of Patent: Nov. 29, 2022

(54) SYSTEMS AND METHODS FOR AUTOMATED CONCAVE LEVELING OF COMBINE HARVESTER

(71) Applicant: DEERE & COMPANY, Moline, IL (US)

(72) Inventors: Eric L. Bortner, Davenport, IA (US); Kevin P. Hurley, Davenport, IA (US); Michael Meschke, Eldridge, IA (US)

(73) Assignee: Deere & Company, Moline, IL (US)

( * ) Notice: Subject to any disclaimer, the term of this patent is extended or adjusted under 35 U.S.C. 154(b) by 490 days.

(21) Appl. No.: 16/814,894

(22) Filed: Mar. 10, 2020

(65) Prior Publication Data

US 2021/0282328 A1    Sep. 16, 2021

(51) Int. Cl.
| | | |
|---|---|---|
| *A01F 12/18* | (2006.01) | |
| *A01F 12/28* | (2006.01) | |
| *A01D 43/08* | (2006.01) | |
| *A01D 41/127* | (2006.01) | |
| *G05B 19/4155* | (2006.01) | |
| *B60W 50/00* | (2006.01) | |
| *G06T 7/62* | (2017.01) | |

(52) U.S. Cl.
CPC ............ *A01F 12/28* (2013.01); *A01D 41/127* (2013.01); *A01D 43/085* (2013.01); *G05B 19/4155* (2013.01); *B60W 2050/0075* (2013.01); *G06T 7/62* (2017.01); *G06T 2207/30188* (2013.01)

(58) Field of Classification Search
CPC .. A01F 12/28; A01F 7/06; A01F 12/24; A01F 12/26; A01D 41/127; A01D 43/085; A01D 41/12; A01D 41/1278; G05B 19/4155; B60W 2050/0075; G06T 2207/30188; G06T 7/62
See application file for complete search history.

(56) References Cited

U.S. PATENT DOCUMENTS

| | | | | |
|---|---|---|---|---|
| 3,552,396 A | * | 1/1971 | Gerhardt | ............... A01D 41/127 460/109 |
| 7,452,267 B2 | * | 11/2008 | Bundy | ................. A01D 75/182 460/6 |
| 8,133,101 B2 | * | 3/2012 | Regier | ................... A01F 12/181 460/109 |

(Continued)

FOREIGN PATENT DOCUMENTS

| | | | | |
|---|---|---|---|---|
| BE | 1022836 B1 | 12/2012 | | |
| CN | 110149917 A | * | 8/2019 | ............. A01F 12/28 |

(Continued)

*Primary Examiner* — Arpad F Kovacs

(57) ABSTRACT

Systems and methods for automatically establishing a gap between a concave and a rotor of a rotary crop processing system are disclosed. Establishing the gap may include displacing the concave towards the rotor until contact is detected therebetween. Contact may be detected using a sensor configured to detect contact between the rotor and the concave. The sensor may be a knock sensor. The concave is displaced away from the rotor when contact is detected until contact between the rotor and the concave is no longer detected. One or more actuators may be coupled to the concave to move the concave relative to the rotor. In some implementations, the actuators may be operated in sequence to form the gap between the rotor and the concave.

20 Claims, 6 Drawing Sheets

(56) References Cited

U.S. PATENT DOCUMENTS

| | | | | |
|---|---|---|---|---|
| 8,157,629 | B2* | 4/2012 | Yanke | A01F 12/28 |
| | | | | 460/109 |
| 9,220,200 | B2* | 12/2015 | Bergkamp | A01F 12/28 |
| 10,405,494 | B2 | 9/2019 | Regier | |
| 2004/0259610 | A1* | 12/2004 | Behnke | A01D 41/127 |
| | | | | 460/59 |
| 2009/0233662 | A1* | 9/2009 | Yanke | A01F 12/28 |
| | | | | 460/68 |
| 2016/0120127 | A1* | 5/2016 | Mackin | A01F 12/28 |
| | | | | 460/6 |
| 2019/0159403 | A1* | 5/2019 | Haar | A01F 7/06 |
| 2022/0201934 | A1* | 6/2022 | Koch | A01D 41/1277 |

FOREIGN PATENT DOCUMENTS

| | | | | |
|---|---|---|---|---|
| DE | 10353385 A1 * | 6/2005 | | A01F 12/28 |
| DE | 10353385 A1 | 6/2005 | | |
| DE | 102012223432 B3 * | 3/2014 | | A01D 43/086 |
| EP | 1344444 B1 | 1/2008 | | |
| EP | 3335543 B1 * | 10/2021 | | A01F 12/10 |
| RU | 2524535 C2 | 7/2014 | | |

\* cited by examiner

SYSTEMS AND METHODS FOR AUTOMATED CONCAVE LEVELING OF COMBINE HARVESTER

FIELD OF THE DISCLOSURE

The present disclosure relates generally to combine harvesters.

BACKGROUND OF THE DISCLOSURE

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have a rotary crop processing unit formed by a rotor and a casing surrounding the rotor. The rotary crop processing unit has an inlet transition section for pulling crop material into a rotary crop processing unit from the feederhouse. The rotary crop processing unit includes a threshing section for threshing the crop material and a separating section for separating the grain from the threshed crop material. The bottom of the casing is provided with a series of grates through which the grain and chaff fall from the casing. The grates, located beneath the threshing section of the rotary crop processing unit, form a concave.

SUMMARY OF THE DISCLOSURE

A first aspect of the present disclosure is directed to a computer-implemented method performed by one or more processors for automatically establishing a gap between a concave and a rotor of a rotary crop processing system. The method may include one of receiving or determining a selected gap size to be formed between the concave and the rotor; displacing the concave towards the rotor; detecting contact between the concave and the rotor with a sensor; ceasing displacement of the concave towards the rotor when contact is detected with the sensor; and displacing the concave away from the rotor until a gap size formed between the concave and the rotor is the selected gap size.

A second aspect of the present disclosure is directed to an apparatus that includes one or more processors and a non-transitory computer-readable storage medium coupled to the one or more processors and storing programming instructions for execution by the one or more processors. The programming instructions may instruct the one or more processors to: one of receive or determine a selected gap size to be formed between the concave and the rotor; displace the concave towards the rotor; detect contact between the concave and the rotor with a sensor; cease displacement of the concave towards the rotor when contact is detected with the sensor; and displace the concave away from the rotor until a gap size formed between the concave and the rotor is the selected gap size.

A third aspect of the present disclosure is directed to system for automatically establishing a gap size between a concave and a rotor of a rotary crop processing system. The system may include a rotor rotatably mounted within the rotary crop processing system; a concave movable relative to rotor; an actuator coupled to the concave, the actuator operable to displace the concave relative to the rotor; and a sensor operable to detect contact between the concave and the rotor. The actuator may be configured to displace the concave towards the rotor until the sensor detects contact between the concave and the rotor and configured to displace the concave away from the rotor after the sensor detects contact between the concave and the rotor until a selected gap size is formed between concave and the rotor.

The various aspects may include one or more of the following features. Displacing the concave towards the rotor may include actuating an actuator coupled to the concave to displace the concave towards the rotor. The actuator may include a plurality of actuators. Actuating an actuator coupled to the concave towards the rotor may include sequentially actuating each of the plurality of actuators in turn to displace the concave towards the rotor. Displacing the concave away from the rotor until the gap size formed between the concave and the rotor is the selected gap size may include actuating an actuator to displace the concave away from the rotor until the gap size formed between the concave and the rotor is the selected gap size. The rotor may be rotated a selected amount as the concave is displaced towards the rotor. The sensor may be a knock sensor. The sensor may be operable to detect contact between the concave and the rotor. The gap size formed between the concave and the rotor may be determined with a displacement sensor. The concave may be locked into position relative to the rotor when the gap size between the concave and the rotor is the selected gap size.

The various aspects may also include one or more of the following features. Programming instructions operable to instruct the one or more processors to displace the concave towards the rotor may include programming instructions operable to instruct the one or more processors to actuate an actuator coupled to the concave to displace the concave towards the rotor. The programming instructions operable to instruct the one or more processors to displace the concave away from the rotor until the gap size is formed may include the programming instructions operable to instruct the one or more processors to sequentially actuate each of the plurality of actuators to displace the concave away from the rotor for a selected amount of displacement that equals the selected gap size. Programming instructions may be operable to instruct the one or more processors to rotate the rotor a selected amount as the concave is displaced towards the rotor. Programming instructions may be operable to instruct the one or more processors to lock the concave in position relative to the rotor when the gap size between the concave and the rotor is the selected gap size.

The various aspects may also include one or more of the following features. The actuator may include a plurality of actuators coupled to the concave along a length of the concave. Each actuator of the plurality of actuators may be configured to sequentially displace the concave towards and away from the concave while forming the selected gap size between the concave and the rotor. The rotor may be configured to be rotated by a selected amount as the concave is displaced towards the rotor by the actuator.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
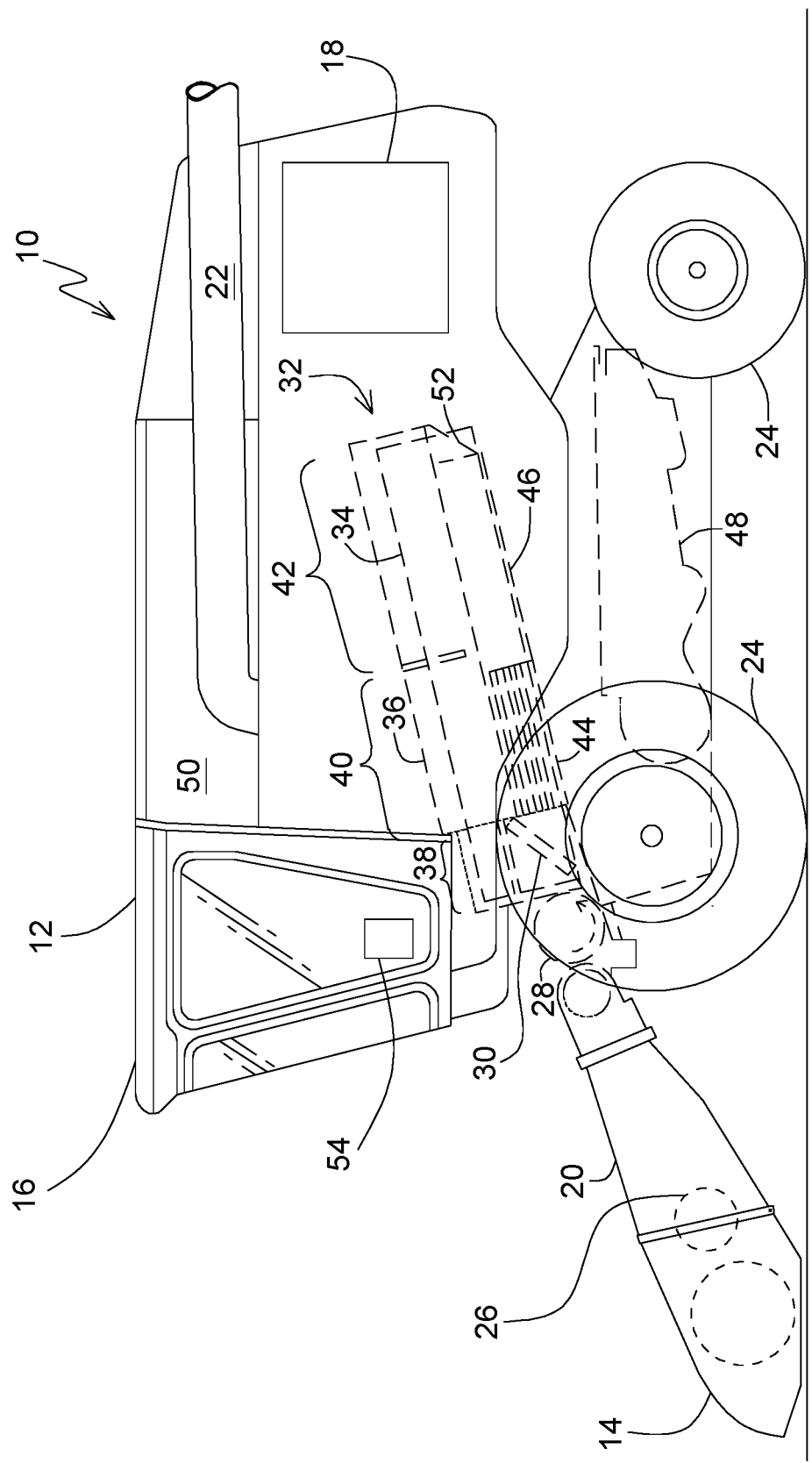
FIG. 1 is a side view of an example combine harvester, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems, methods, and apparatuses for adjusting a separation distance between a rotor and a concave disposed adjacent to the rotor of a rotary crop processing system. Particularly, the present disclosure is directed to automatically adjusting a distance between the rotor and the concave using feedback related to an amount of clearance between the rotor and the concave. In some instances, automatically adjusting a distance between the rotor and the concave may be performed during what is generally termed leveling and zeroing operation in which a concave is aligned with a rotor and offset from the rotor by a defined distance along an entire length of the rotor. A concave that is level relative to the rotor and positioned at a "zero" or initial position defines a baseline reference position and provides a datum from which a gap formed between the rotor and the concave may be measured. A gap formed between the concave and rotor with the rotor leveled relative to the rotor and at the zero position may be subsequently adjusted before or during a harvesting operation, for example, to accommodate a size of grain being harvested. Feedback in the form of vibration or contact may be used to detect interference between the rotor and the concave, and an amount of clearance between the rotor and the concave may be adjusted in response to the detected vibration or contact.

The present disclosure for automatically adjusting clearance between a rotor and a concave reduces harvester downtime and, thereby, increases harvester productivity. Further, the systems and methods of the present disclosure reduce labor costs associated with establishing a clearance distance between the rotor and the concave.

FIG. 1 is a perspective view of an example combine harvester 10. The combine harvester 10 includes a work vehicle 12 and a head 14. The work vehicle 12 includes an operator cab 16, an engine 18, a feederhouse 20, a dispensing chute 22, and a plurality of wheels 24. In other implementations, the work vehicle 12 may include one or more tracks in place of the one or more of the wheels 24.

The head 14 is operable to harvest crops. The harvested crops are directed to the feederhouse 20, such as by a cross auger 26 included in the head 14, and the feederhouse 20 directs the harvested crop to a beater 28. In some instances, a feeder belt may be used instead of or in addition to the cross auger 24 to direct crops to the feederhouse 20. The beater 28 directs the crop through an inlet transition section 30 to a rotary crop processing system 32.

The rotary crop processing system 32 threshes and separates the harvested crop material. The example rotary crop processing system 32 includes a rotor 34 radially surrounded by a casing 36 that together define an inlet section 38, a threshing section 40 and a separating section 42. The rotor 34 includes a hollow cylindrical drum having a plurality of crop processing components, such as rasp bars, that engage the harvested crops and rotate the harvested crops in the casing 36. The bottom of the casing 36 includes a concave 44 located at the threshing section 40 adjacent to the rotor 34 and a separating grate 46 located at the separating section 42. In other implementations, the rotary crop processing system 32 may include different or additional components or omit one or more components described herein.

Grain and chaff falling through the concave 44 and the separating grate 46 are directed to cleaning system 48. The cleaning system 48 removes chaff from the grain and directs the clean grain to a clean grain elevator (not shown). The clean grain elevator deposits the clean grain in a grain tank 50. The clean grain in the tank 50 can be unloaded, such as into a grain cart or truck, by the dispensing chute 22. Threshed and separated straw is discharged from the rotary crop processing system 32 through outlet 52 to a discharge beater (not shown). The discharge beater in turn propels the straw out the rear of the combine harvester 10. Operation of the combine harvester 10 may be controlled from operator cab 16.

The combine harvester 10 also includes a controller 54 operable to control aspects of the combine harvester 10, such as a gap formed the rotor 34 and the concave 44 of the rotary crop processing system 32. Particularly, the controller 54 is operable to level and position the concave 44 at a "zero" or initial position relative to the rotor 34 and establish the concave at the baseline reference position. The controller 54 is communicably coupled to one or more sensors, described in more detail below, operable to detect contact between the rotor 34 and the concave 44. In response to the detected contact, the controller 54 is operable to adjust a position of the concave 44 relative to the rotor 34.

Figure 2:
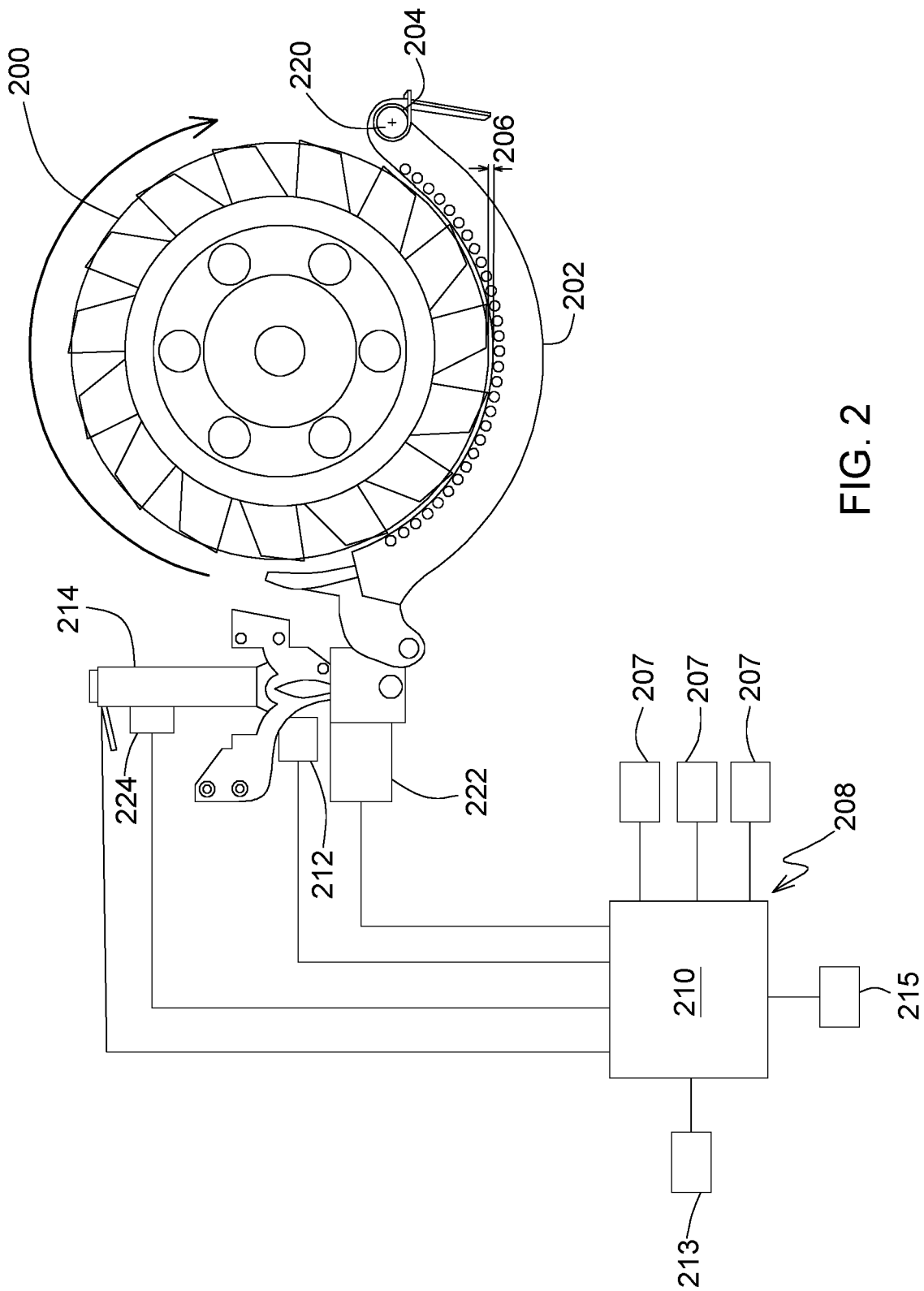
FIGS. 2 and 3 are schematic views of an example automated system for defining a gap size between a concave and a rotor of a combine harvester, according to some implementations of the present disclosure.

FIG. 2 is a schematic view of an end of an example rotor 200 and an adjacent concave 202. In the illustrated example, the concave 202 is pivotably mounted relative to the rotor at a pivot pin 204. In some implementations, a two or more-pivot pins 204 aligned along a common axis may be used. In other implementations, a single pivot pin 204 may be used. In other implementations, the concave 202 may be movable relative to the rotor 200 in other ways. A clearance or gap 206 is formed between the rotor 200 and the concave 202. An initial gap 206 may be defined between the rotor 200 and the concave 202 when the concave 202 is positioned at the baseline reference position, i.e., when the concave 202 is leveled and positioned at the initial position relative to the rotor 200. In some implementations, a size of the initial gap 206 may be a resulting gap formed between the concave 202 and the rotor 200 when displacement of the concave 202 away from the rotor 200 is ceased once contact between the rotor 200 and the concave 202 is no longer detected. The gap 206 may be increased beyond the initial gap 206 to a desired size, for example, to control processing (e.g., threshing) of the harvested crops.

A size of the initial gap 206 may be automatically achieved by a control system 208. For example, the control system 208 may be operable to automatically or autonomously establish the initial gap 206 between the rotor 200 and the concave 202. The control system 208 may be operable to establish the gap 206. In some implementations, the gap 206 is defined once contact between the rotor 200 and the concave 202 is no longer detected (e.g., with the use of a sensor), at which time displacement of the concave 202 is ceased. In some implementations, the initial gap 206 may be based on a user selected gap established once contact between the concave 202 and the rotor 200 is no longer detected.

Figure 3:
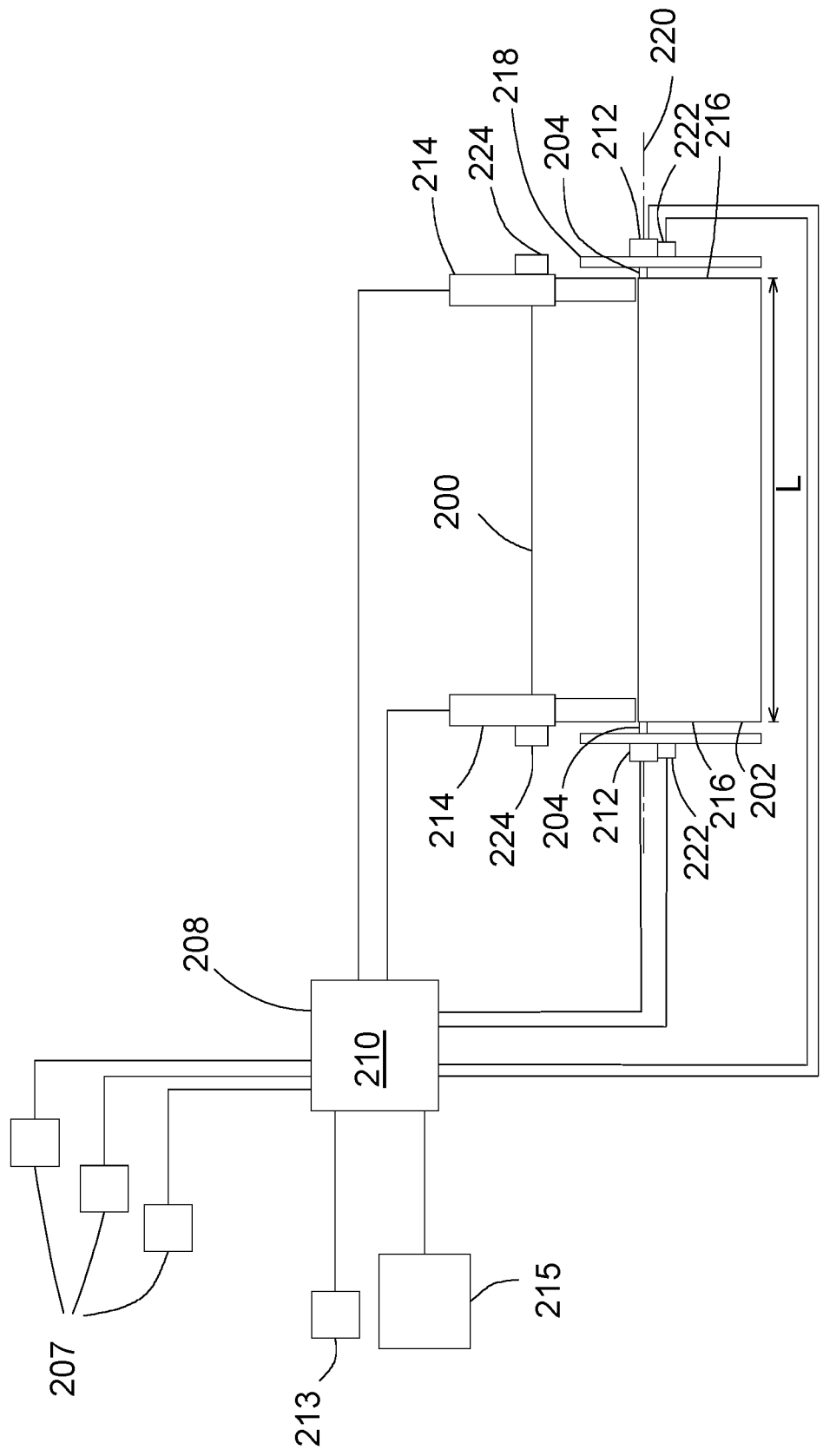

In the illustrated example, the control system 208 includes a controller 210, a sensor 212, and an actuator 214. The sensors 207 are also coupled to the controller 210, and the controller 210 receives information from the sensors 207. Although a single sensor 212 and a single actuator 214 are shown, the scope of the disclosure is not so limited. For example, in some implementations, two or more actuators 214 may be disposed at locations along a length L of the concave 202, as shown in FIG. 3. In some implementations, an actuator 214 may be located at opposing longitudinal ends 216 of the concave 202, as shown in FIG. 3. In other implementations, the actuators 214 may be positioned at other locations along the length L of the concave 202, such as at location between the ends 216 of the concave 202. In still other implementations, three or more actuators 214 may be used. The control system 208 may also include a display 213 and user input device 215. The display 213 is operable to display information to a user and, in some implementations, may also be used as an input device to input information into the control system 208. The input device 215 may be any device operable to permit a user to input information into the control system 208, such as a keyboard, mouse, control stick, or other type of input device.

As also shown in FIG. 3, two or more sensors 212 may be used. In some implementations, the sensors 212 may be located along the length L of the concave 202 at positions corresponding to where the actuators 214 are provided. In other implementations, one or more additional sensors 212 may be provided at locations along the length L of the concave 202 where an actuator 214 is not provided. Although terms in the plural form, such as "actuators" and "sensors," may be used to describe aspects or parts of the present disclosure (such as components of a control system within the scope of the present disclosure), it is to be understood that use of terms in the plural is not intended to exclude a single instance or a single component. For example, although the term "actuators" and "sensors" may be used, it is intended that implementations having a single actuator or a single sensor are also encompassed by such descriptions.

In some implementations, the sensors 212 are operable to detect contact between the rotor 200 and the concave 202. For example, the sensors 212 include sensors that detect sound, vibration, contact, or otherwise detect physical engagement between components. In some implementations, the sensors 212 may include knock sensors. In some implementations, knock sensors may be accelerometer-based knock sensors, such as a KS-4-KI knock sensor produced by Robert Bosch GmbH of Robert-Bosch-Platz 1, 70839 Gerlingen-Schillerhöhe Germany. However, other types of sensors operable to detect contact between components may be used. In some implementations, the sensors 212 may be disposed on the concave 202. In some implementations, the sensors 212 may be disposed on the actuator 214. In still other implementations, the sensors 212 may be disposed on a frame 218 that supports the concave 202 or another part of the combine harvester where the sensors 212 are operable to detect contact between the concave 202 and the rotor 200. Still further, a placement location of one sensor 212 may be different than another sensor 212. That is, one or more sensors 212 may be located on a first part of the combine harvester, such as on the concave 202 while one or more other sensors 212 may be located at a different part of the combine harvester, such as the frame 218 or the actuator 214. Thus, locations of the sensors 212 may be varied.

The actuators 214 may be hydraulic actuators (e.g., a hydraulic cylinder), electrical actuators, pneumatic actuators (e.g., a pneumatic cylinder), mechanical actuators (e.g., a jackscrew), or a combination of these. In some implementations, one or more actuators 214 may be of a different type than one or more other actuators 214. In some implementations, one or more of the actuators 214 may be a linear actuator. Still further, the actuators 214 may be any type of actuator operable to move the concave 202, such as pivoting the concave 202 about an axis 220 defined by pivot pin 204.

The combine harvester, such as combine harvester 10, may also include a concave locking system 222. The concave locking system 222 is operable to lock the concave 202 into a position relative to the rotor 200. For example, the concave locking system 222 may be used to lock the concave 202 in position relative to the rotor 200 once a selected gap 206, e.g., the initial gap 206, is achieved. The concave locking system 222 is operable to fix a position of the concave 202 relative to the rotor 200 at a selected gap 206 and, thereafter, prevent the gap 206 from being altered. In some implementations, when engaged with the concave 202, the concave locking system 222 is operable to prevent movement of the concave 202 towards the rotor 200 but allow movement of the concave 202 away from the rotor 200. Movement of the concave 202 away from the rotor 200 may be desired during a harvesting operation in response to a type of crop being harvested or other received information. Consequently, with the concave 202 positioned at the initial position (i.e., with the concave 202 leveled and "zeroed"), engagement of the concave locking system 222 maintains a datum by preventing the concave 202 from being displaced towards the rotor 200.

The concave locking system 222 may include one or more releasable locking components (e.g., clamps) that are operable to releasably secure the concave 202 in a selected position. The releasable locking components are operable to release the concave 202, thereby permitting a position of the concave 202 relative to the rotor 200 (e.g., about the axis 220) to be adjusted. Once a position of the concave 202 is adjusted, the one or more releasable locking components may be reengaged to fix a position of the concave 202 at the new location relative to the rotor 200.

The control system 208 may also include one or more displacement sensors 224. Although two displacement sensors 224 are shown, additional or fewer displacement sensors 224 may be used. Example displacement sensors 224 include linear displacement sensors and rotary sensors. The displacement sensors 224 are operable to detect an amount by which the concave 202 is moved relative to the rotor 200. For example, the displacement sensors 224 may be used to detect an amount by which the concave 202 is displaced away from the rotor 200, such as after contact is detected therebetween using the sensors 212. The size of the initial gap 206 and the position of the concave relative to the rotor when the initial gap is determined (i.e., the initial position) may be sensed, such as by the displacement sensors 224, and recorded. The initial position and the initial gap size may be recorded in memory, such as a memory device of the controller 210.

The displacement sensors 224 provide information to the controller 210 to detect when the concave 202 is positioned relative to the rotor 200 to define a desired gap therebetween. When a selected distance between the rotor 200 and the concave 202 is detected using the displacement sensors 224, the controller 210 stops operation of the actuators 214, such as by sending a signal to the actuators 214 that stops actuation of the actuators 214, when the selected distance, e.g., the desired gap, is sensed. In some implementations, the selected distance may be directedly sensed by the displacement sensors 224, or, in some implementations, the controller 210 may use output from the displacement sensors 224 in an algorithm to determine a gap formed between the rotor 200 and the concave 202. For example, an algorithm may include a relationship that correlates a distance formed between the rotor 200 and the concave 202 and movement of the actuators 214.

In some implementations, the sensors 224 may be coupled to the actuators 214 to detect an amount of displacement experienced by the actuators 214 during operation of the actuators 214. In other implementations, the sensors 224 may include a sensor operable to detect a change in distance between components of the rotary crop processing system of a harvester combine. The rotary crop processing system may be similar to the rotary crop processing system 32. In some implementations, the sensors 224 may be operable to detect a distance between the rotor and the concave. The sensors 224 may be used to detect a distance between other components, and the controller 210 may be operable to calculate a gap between the rotor 200 and the concave 202 using output measurements provided by the sensors 224.

In operation, according to some implementations, the controller 210 is operable to level and zero a concave (e.g., concave 34 or 202) relative to a rotor (e.g., rotor 36 or 200) by detecting contact between the concave and the rotor as the concave is moved towards the rotor and ceasing displacement of the concave away from the rotor when contact between the rotor and the concave is no longer detected. A gap formed between the rotor and the concave when the displacement of the concave is ceased once contact is no longer detected defines the "zero" or initial gap between the rotor and the concave. As explained above, the initial position of the rotor and the initial gap size may be recorded. The stored initial position and initial gap size may be used at a later time, as desired.

Figure 4:
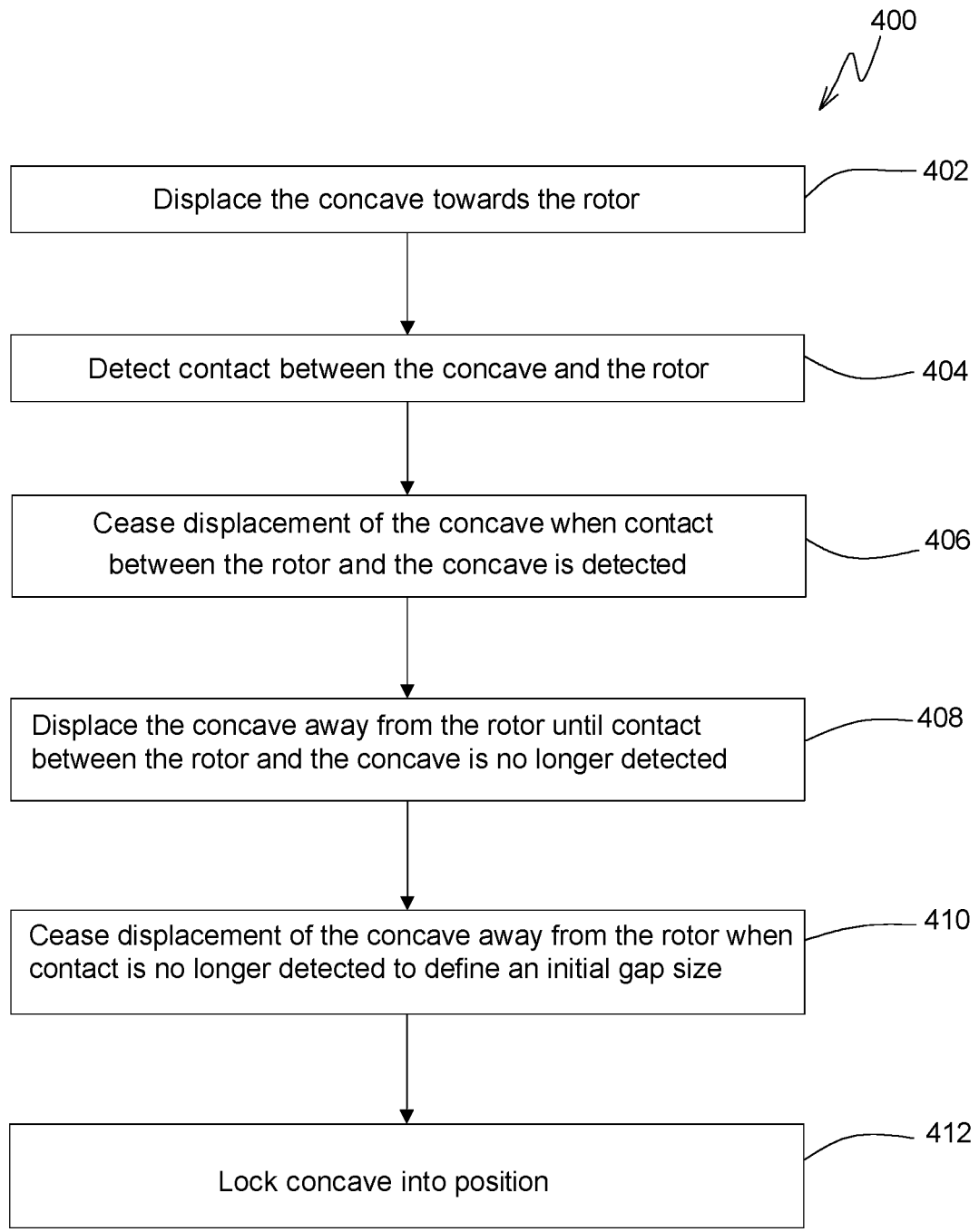
FIG. 4 is a flowchart of an example method of forming a gap of a desired size between a rotor and a concave of a rotary processing system, according to some implementations of the present disclosure.

FIG. 4 is an example method 400 for defining a gap formed between a rotor and a concave of a combine harvester. Particularly, the method 400 operates to "level" or position a concave from a rotor with a uniform separation along a length of the rotor. An amount of the separation formed between the rotor and the concave during leveling may be established as an initial offset, which is defined as an initial or "zero" position. Generally, the "zero" position is one in which the concave is located at a defined positioned adjacent to the rotor although not contacting the rotor. The "zero" or initial position of the concave corresponds to an initial gap formed between the concave and the rotor. In some implementations, the initial gap may be two to four millimeters (mm). In other implementations, the initial gap may be one millimeter or less. In still other implementations, the initial gap may be greater than four millimeters. The initial gap defines a datum from which the concave may be subsequently adjusted to accommodate a type of crop being harvested.

At 402, a desired gap size, e.g., an initial gap size, formed between a rotor and a concave is determined or received. In some implementations, the gap size may be determined based on a desired setting received by a user. For example, a user may enter a desired gap size into a control system using a user input device. In some implementations, a gap size between the rotor and the concave may be determine, in whole or part, using information provided from one or more sensors.

At 402, the concave is displaced towards to rotor until, at 404, contact is detected between the concave and the rotor. The rotor may be rotated by a desired amount when detecting contact between the rotor and the concave. For example, the rotor may be rotated at a selected number of revolutions per minute (RPM). In some instances, the RPM of the rotor may be within a range of 150 RPM to 250 RPM. This RPM range may be associated with an engine of a combine harvester operating at an idle condition. In other implementations, contact between the rotor and the concave may be performed with the rotor stationary or with the rotor pivoting a selected number of degrees. For example, in some implementations, the rotor may be pivoted relative to the concave less than 10°, 20°, 30°, 40°, 50°, 60°, 70°, 80°, or 90°. In some implementations, the angular rotation of the rotor may be more than 90° but less than 360°. For example, an amount by which the rotor is rotated relative to the concave to detect contact therebetween may be defined by an amount that ensures a portion of the rotor having the largest radial extension contacts the concave when the concave is moved towards the rotor.

In some implementations, the concave may be displaced by operation of one or more actuators. In some implementations, displacement of the concave towards the rotor is performed automatically. For example, a controller, such as an electronic controller, automatically operates the one or more actuators to displace the concave towards the rotor. Contact between the concave and the rotor is detected by one or more sensors. The sensors may include, for example, a knock sensor or other sensor operable to detect contact between the rotor and the concave. A signal from the one or more sensors operable to detect contact between the rotor and the concave is received by the controller. For example, at 406, the controller stops displacement of the concave towards the rotor upon receipt of the signal from the one or more sensors that indicates contact between the rotor and the concave. At 408, the concave is displaced away from the rotor until contact between the rotor and the concave is no longer detected by the one or more sensors. At 410, displacement of the concave away from rotor is ceased when contact between the rotor and the concave is no longer detected. A position of the concave when movement of the concave away from the rotor is stopped defines the initial gap between the concave and the rotor. A size of the initial gap may be detected using one or more sensors that is operable to detect, or provide information that is usable to determine, a position of the concave relative to the rotor. Such sensors may be referred to as "displacement sensors." Further, the initial position of the concave relative to the rotor may be recorded, such as in a memory device. Recordation of the initial position allows the concave to be returned to the initial position at any time. Further, the size of the initial gap may also be recorded.

Due to a size of the gap formed between concave and rotor, the flexibility associated with a concave, and a desired level of accuracy of the gap, different actuators coupled to different portions of the concave may be operated independently from other actuators also coupled to the concave. Each actuator may be operated to displace the concave towards the rotor until contact is detected using the sensors. When contact is detected, displacement of the concave towards the rotor is ceased. The actuator then displaces the concave away from the rotor by a first amount. In some implementations, each actuator coupled to the concave is sequentially operated in a similar way to position the concave away from the rotor by the first amount. One or more displacement sensors may be used to control operation of the actuators to produce a gap between the concave and the rotor equal to the first amount.

In some implementations, the concave may be moved to the initial position to define the initial gap in a series of step-wise movements relative to the rotor. In each step or cycle, each of the actuators operable to displace the concave relative to the rotor may be operated separately. The concave may be repositioned relative to the rotor after being located at the first amount relative to the rotor. Because the concave may have flexibility along a length thereof, operation of a subsequent actuator after positioning of the concave by a first or previous actuator may alter the separation distance or gap formed between the rotor and the concave to no longer be equal to a selected amount (e.g., the first amount). Consequently, when all of the actuators have been operated to establish the corresponding portion of the concave at a position from the rotor equal to the first amount, the actuators are once again operated in sequence to bring the concave into contact with the rotor.

When contact is detected by the sensor, movement of the concave towards the rotor is ceased, and the actuator then displaces the concave away from the rotor until the concave is displaced from the rotor by a second amount. The second amount may be determined using one or more displacement sensors, as described earlier. The second amount may be less than the first amount. The remaining actuators are then operated similarly until each of the actuators has positioned the concave away from the rotor by the second amount. This process may be repeated any desired number of times, displacing the concave away from the rotor after detecting contact therebetween at a lesser distance than a distance used in a previous positioning cycle, until, on the last cycle of the process, displacement of the concave away from the rotor is ceased once contact therebetween is no longer detected by the one or more sensors. This final position of the concave relative to the rotor when movement of the concave is ceased defines the "zero" position of the concave and the initial gap formed between the concave and the rotor.

A number of positioning cycles in which the concave is brought into contact with the rotor and then displaced therefrom by a desired amount sequentially by each actuator may be performed. The number of cycles may be user-selected or a predefined number. The predefined number may be stored in memory within or connected to a controller, which may be similar to controller 210, that controls formation of the initial gap. The selected amount of displacement of the concave from the rotor for each positioning cycle may be less than the selected amount used in the previous positioning cycle. As the starting distance between the rotor and the concave for each positioning cycle decreases, distortion of the gap formed between the rotor and the concave caused by sequential movements of the actuators diminishes to a de minimis amount. Once an acceptable level of distortion is achieved, the positioning cycles may be ceased, and the position of the concave relative to the rotor, i.e., the gap, may be established.

Although sequential operation of each actuator is described in establishing the gap between the concave and the rotor, in other implementations, two or more actuators may be operated at the same time to bring the concave into contact with the rotor and then displace the concave away from the rotor to form a selected amount of displacement.

In some implementations, when the gap is established, a concave locking system (such as concave locking system 222) may be actuated to fix the position of the concave relative to the rotor, preventing inadvertent movement of the concave towards the rotor and, thus, preventing alteration to the established gap, as indicated at 412. At 412, with the concave positioned such that the initial gap is formed, the concave is locked into position. As explained earlier, locking the concave in position prevents movement of the concave towards the rotor. In some implementations, locking the concave in position relative to the rotor prevents movement of the concave towards the rotor while permitting movement of the concave away from the rotor. The concave may be locked into position with the concave locking system.

Figure 5:
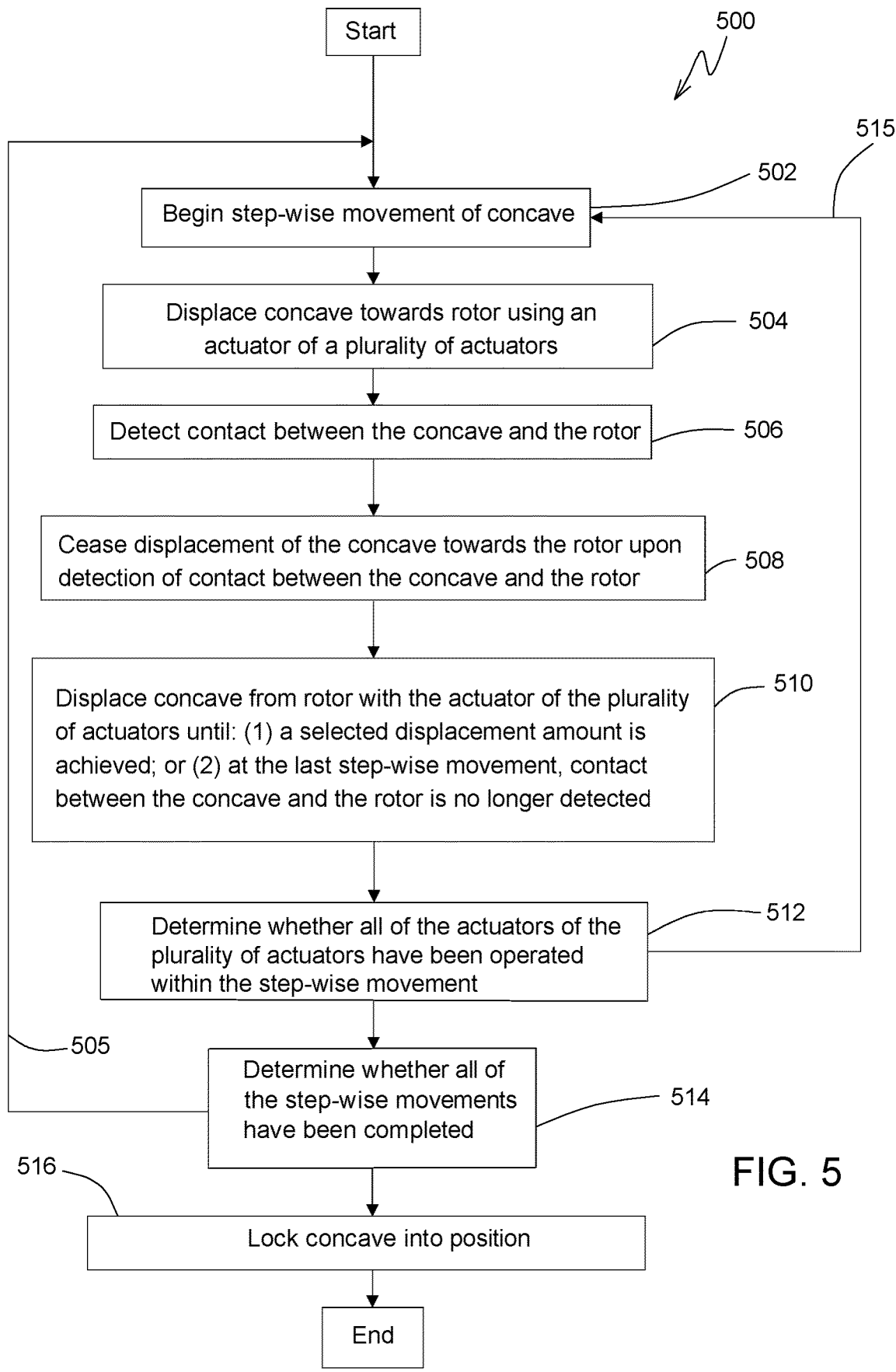
FIG. 5 is a flowchart of another example method of forming a gap of a desired size between a rotor and a concave of a rotary processing system, according to some implementations of the present disclosure.

FIG. 5 is another example method 500 for defining a gap formed between a rotor and a concave of a combine harvester using a series of movements of a plurality of actuators. Particularly, the method 500 is applicable to leveling and zeroing a concave to form an initial gap between a rotor and a concave. The plurality of actuators are operated to position the concave relative to the rotor in a step-wise fashion. Each step-wise movement involves moving each actuator of a plurality of actuators in sequence to achieve a selected amount of offset or displacement between the rotor and the concave. The step-wise movements may be continued until a desired gap size is formed between the rotor and the concave.

At 502, a step-wise movement of the concave is initiated. Each step-wise movement includes sequential operation a plurality of actuators coupled to the concave. For each step, the plurality of actuators are operated sequentially to form a selected amount of displacement between the rotor and the concave. In some implementations, the number of step-wise movements (i.e., the number of times loop 505 is repeated) may be selected by a user. In some implementations, the number of step-wise movements may be defined by an algorithm, and the algorithm may be installed into a controller, such as controller 210, at the time of manufacturing or at a subsequent time.

At 504, a first actuator of the plurality of actuators is operated to displace the concave towards the rotor. At 506, contact is detected between the rotor and the concave. As explained above, the rotor may be rotated at a selected RPM or for a selected number of degrees to detect contact between the rotor and the concave. At 508, displacement of the concave towards the rotor by the first actuator is ceased when contact between the rotor and the concave is detected. Contact between the rotor and the concave may be detected with a sensor, such as a knock sensor or other sensor operable to detect contact or vibration, for example. At 510, the first actuator is operated to displace the concave away from the rotor until a selected amount of displacement is obtained. One or more displacement sensors, as described above, may be used to determine when the selected amount of displacement is obtained. For a first movement step, the selected amount of displacement may be a first amount of displacement. For a second movement step, the selected amount of displacement may be a second amount of displacement, and so on. Further, as the number of movement steps progress, the selected amount of displacement may progressively decrease. Thus, for obtaining a selected gap size using three step-wise movements of the concave, the selected amount of displacement at the third step may be less than a selected amount of displacement at the second step, which may be less than the selected amount of displacement at the first step.

At 512, a determination is made as to whether all of the actuators of the plurality of actuators have been operated to locate the concave at the selected amount of displacement relative to the rotor within a particular step-wise movement. If one or more actuators have yet to be operated, the method 500 returns to 502 and loop 515 that includes 502 through 512 is repeated until all actuators for a given step-wise movement have been operated to locate the concave at the selected amount of displacement. When all of the actuators of the plurality of actuators have been operated for a particular step-wise movement, the method 500 proceeds to 514 where a determination is made as to whether all of the step-wise movements have been performed. If the answer is "yes" and all of the step-wise movements have been performed, the method 500 stops. If the answer is "no" and one or more step-wise movements remain, the method proceeds to 502 where the next step-wise movement begins. The method 500 continues in this manner until all of the step-wise movements of the plurality of actuators have been completed. The number of step-wise movements may be user-selected. In other implementations, the number of step-wise movements may be a stored value that is received by a controller that is used to define the initial gap between the concave and the rotor.

During the final step-wise movement, at 510, the concave is displaced from the rotor until contact is no longer detected, at which point displacement of the concave is stopped. When all of the actuators have performed this operation during the final step-wise movement, the concave is leveled relative to the rotor; the "zero" or initial position of the concave is defined; and the initial gap is established.

As explained above, the selected amount of displacement for each step-wise movement may be decreasing. Further, the selected amount of displacement for the final step-wise movement may correspond to the selected gap size. Thus, at 514, when all of the step-wise movements have been completed, the gap size formed between the rotor and the concave is the initial gap size. With the desired gap size formed, at 516, the concave may be locked into position relative to the rotor. With the concave locked in position, the concave is prevented from being displaced towards the rotor, which prevents alteration of the established desired gap size. The concave may be locked into position using a concave locking system.

Without in any way limiting the scope, interpretation, or application of the claims appearing below, a technical effect of one or more of the example embodiments disclosed herein is automating establishment of a gap formed between a concave and a rotor of a combine harvester. These automated methods and systems reduces downtime for the equipment, reduces or eliminates labor associated with positioning a concave relative to a rotor, and, consequently, reduces costs associated with positioning a concave at a desired gap size relative to a rotor. Further, with equipment downtime reduce, an amount of time for harvesting is increased.

Figure 6:
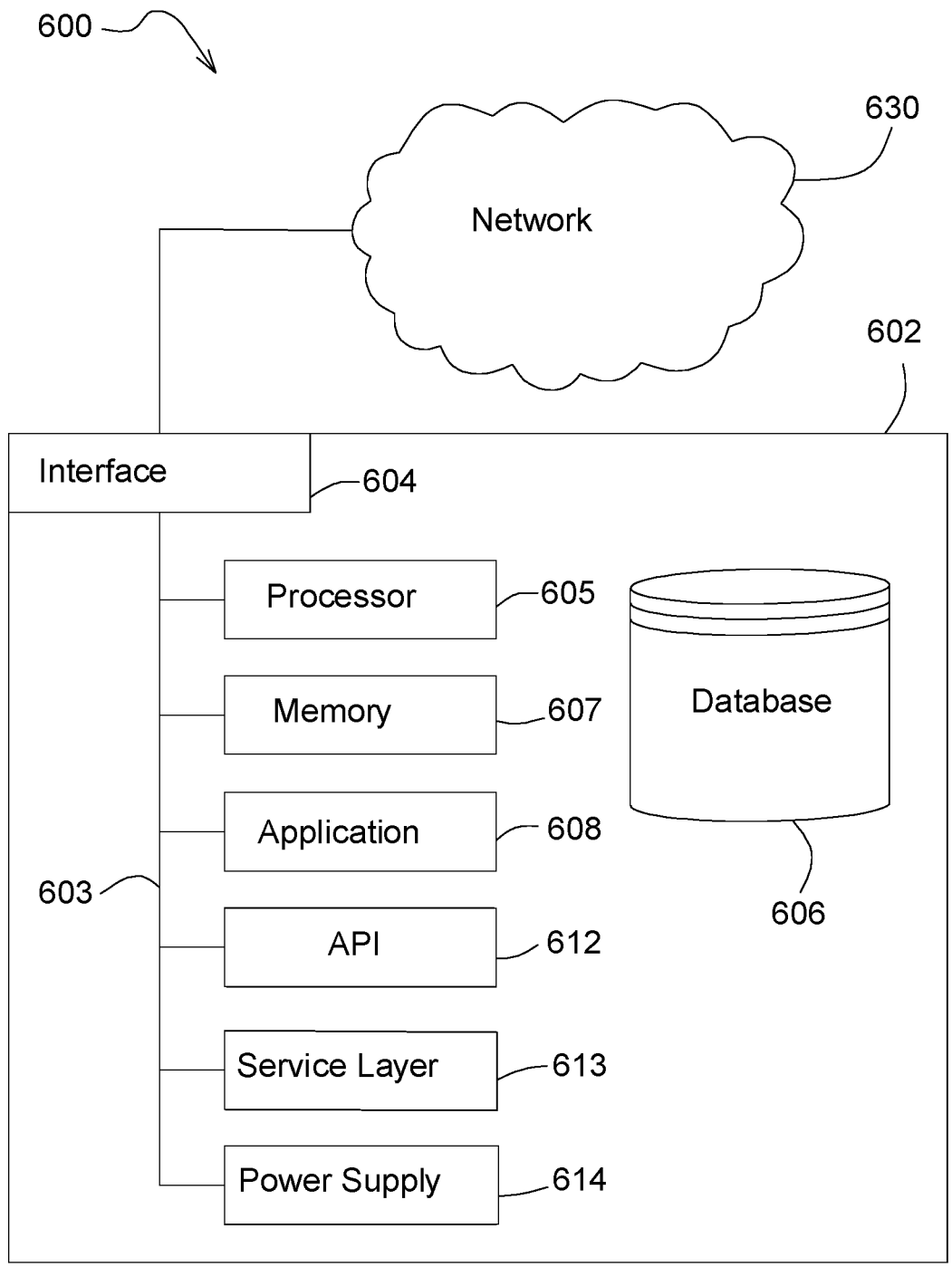
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality.

While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes: one of receiving or determining a selected gap size to be formed between the concave and the rotor; displacing the concave towards the rotor; detecting contact between the concave and the rotor with a sensor; ceasing displacement of the concave towards the rotor when contact is detected with the sensor; and displacing the concave away from the rotor until a gap size formed between the concave and the rotor is the selected gap size.

The foregoing and other described implementations can each, optionally, include one or more of the following features:

A first feature, combinable with any of the following features, wherein displacing the concave towards the rotor includes actuating an actuator coupled to the concave to displace the concave towards the rotor.

A second feature, combinable with any of the previous or following features, wherein the actuator includes a plurality of actuators, and wherein actuating an actuator coupled to the concave towards the rotor includes sequentially actuating each of the plurality of actuators in turn to displace the concave towards the rotor.

A third feature, combinable with any of the previous or following features, wherein displacing the concave away from the rotor until the gap size formed between the concave and the rotor is the selected gap size includes actuating an actuator to displace the concave away from the rotor until the gap size formed between the concave and the rotor is the selected gap size.

A fourth feature, combinable with any of the previous or following features, the method further including rotating the rotor a selected amount as the concave is displaced towards the rotor.

A fifth feature, combinable with any of the previous or following features, wherein the sensor is a knock sensor.

A sixth feature, combinable with any of the previous or following features, wherein the sensor is operable to detect contact between the concave and the rotor.

A seventh feature, combinable with any of the previous or following features, the method further including determining the gap size formed between the concave and the rotor with a displacement sensor.

An eighth feature, combinable with any of the previous features, the method further including locking the concave in position relative to the rotor when the gap size between the concave and the rotor is the selected gap size.

In a second implementation, a non-transitory, computer-readable medium storing one or more instructions executable by a computer system to perform operations including: one of receiving or determining a selected gap size to be formed between the concave and the rotor; displacing the concave towards the rotor; detecting contact between the concave and the rotor with a sensor; ceasing displacement of the concave towards the rotor when contact is detected with the sensor; and displacing the concave away from the rotor until a gap size formed between the concave and the rotor is the selected gap size.

The foregoing and other described implementations can each, optionally, include one or more of the following features:

A first feature, combinable with any of the following features, wherein displacing the concave towards the rotor includes actuating an actuator coupled to the concave to displace the concave towards the rotor.

A second feature, combinable with any of the previous or following features, wherein the actuator includes a plurality of actuators, and wherein actuating an actuator coupled to the concave towards the rotor includes sequentially actuating each of the plurality of actuators in turn to displace the concave towards the rotor.

A third feature, combinable with any of the previous or following features, wherein displacing the concave away from the rotor until the gap size formed between the concave and the rotor is the selected gap size includes actuating an actuator to displace the concave away from the rotor until the gap size formed between the concave and the rotor is the selected gap size.

A fourth feature, combinable with any of the previous or following features, the non-transitory, computer-readable medium further including one or more instructions executable by a computer system to perform the operation of rotating the rotor a selected amount as the concave is displaced towards the rotor.

A fifth feature, combinable with any of the previous or following features, wherein the sensor is a knock sensor.

A sixth feature, combinable with any of the previous or following features, wherein the sensor is operable to detect contact between the concave and the rotor.

A seventh feature, combinable with any of the previous or following features, the non-transitory, computer-readable medium further including one or more instructions executable by a computer system to perform the operation of determining the gap size formed between the concave and the rotor with a displacement sensor.

An eighth feature, combinable with any of the previous features, the non-transitory, computer-readable medium further including one or more instructions executable by a computer system to perform the operation of locking the concave in position relative to the rotor when the gap size between the concave and the rotor is the selected gap size.

In a third implementation, a computer-implemented system including one or more processors and a non-transitory computer-readable storage medium coupled to the one or more processors and storing programming instructions for execution by the one or more processors, the programming instructions instructing the one or more processors to: one of receive or determine a selected gap size to be formed between the concave and the rotor; displace the concave towards the rotor; detect contact between the concave and the rotor with a sensor; cease displacement of the concave towards the rotor when contact is detected with the sensor; and displace the concave away from the rotor until a gap size formed between the concave and the rotor is the selected gap size.

The foregoing and other described implementations can each, optionally, include one or more of the following features:

A first feature, combinable with any of the following features, wherein the programming instructions operable to instruct the one or more processors to displace the concave towards the rotor includes programming instructions operable to instruct the one or more processors to actuate an actuator coupled to the concave to displace the concave towards the rotor.

A second feature, combinable with any of the previous or following features, wherein the actuator comprises a plurality of actuators, and wherein the programming instructions operable to instruct the one or more processors to displace the concave towards the rotor includes programming instructions operable to instruct the one or more processors to sequentially actuate each of the plurality of actuators to displace the concave towards the rotor.

A third feature, combinable with any of the previous or following features, wherein the actuator includes a plurality of actuators and wherein the programming instructions operable to instruct the one or more processors to displace the concave away from the rotor until the gap size is formed includes the programming instructions operable to instruct the one or more processors to sequentially actuate each of the plurality of actuators to displace the concave away from the rotor for a selected amount of displacement that equals the selected gap size.

A fourth feature, combinable with any of the previous or following features, further including programming instructions operable to instruct the one or more processors to rotate the rotor a selected amount as the concave is displaced towards the rotor.

A fifth feature, combinable with any of the previous or following features, wherein the sensor is a knock sensor.

A sixth feature, combinable with any of the previous features, further including programming instructions operable to instruct the one or more processors to lock the concave in position relative to the rotor when the gap size between the concave and the rotor is the selected gap size.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random-access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A computer-implemented method performed by one or more processors for automatically establishing a gap between a concave and a rotor of a rotary crop processing system, the method comprising the following operations:
  displacing the concave towards the rotor;
  detecting contact between the concave and the rotor with a sensor;
  ceasing displacement of the concave towards the rotor when contact is detected with the sensor; and
  displacing the concave away from the rotor until contact between the rotor and the concave is not detected by the sensor.

2. The computer-implemented method of claim 1, wherein displacing the concave towards the rotor comprises actuating an actuator coupled to the concave to displace the concave towards the rotor.

3. The computer-implemented method of claim 2, wherein the actuator comprises a plurality of actuators, and wherein actuating an actuator coupled to the concave towards the rotor comprises sequentially actuating each of the plurality of actuators in turn to displace the concave towards the rotor.

4. The computer-implemented method of claim 1, wherein displacing the concave away from the rotor until contact between the rotor and the concave is not detected by the sensor comprises actuating an actuator to displace the concave away from the rotor until contact between the concave and the rotor is not detected.

5. The computer-implemented method of claim 1, further comprising rotating the rotor a selected amount as the concave is displaced towards the rotor.

6. The computer-implemented method of claim 1, wherein the sensor is a knock sensor.

7. The computer-implemented method of claim 1, further comprising determining the gap size formed between the concave and the rotor with a displacement sensor.

8. The computer-implemented method of claim 1, further comprising locking the concave into position relative to the rotor when contact between the concave and the rotor is not detected by the sensor.

9. An apparatus comprising:
one or more processors; and
a non-transitory computer-readable storage medium coupled to the one or more processors and storing programming instructions for execution by the one or more processors, the programming instructions instruct the one or more processors to:
displace the concave towards the rotor;
detect contact between the concave and the rotor with a sensor;
cease displacement of the concave towards the rotor when contact is detected with the sensor; and
displace the concave away from the rotor until contact between the concave and the rotor is not detected by the sensor.

10. The apparatus of claim 9, wherein the programming instructions operable to instruct the one or more processors to displace the concave towards the rotor comprises programming instructions operable to instruct the one or more processors to actuate an actuator coupled to the concave to displace the concave towards the rotor.

11. The apparatus of claim 9, wherein the actuator comprises a plurality of actuators, and wherein the programming instructions operable to instruct the one or more processors to displace the concave towards the rotor comprises programming instructions operable to instruct the one or more processors to sequentially actuate each of the plurality of actuators to displace the concave towards the rotor.

12. The apparatus of claim 9, wherein the actuator comprises a plurality of actuators and wherein the programming instructions operable to instruct the one or more processors to displace the concave away from the rotor until contact between the concave and the rotor is not detected by the sensor comprises the programming instructions operable to instruct the one or more processors to sequentially actuate each of the plurality of actuators to displace the concave away from the rotor until contact between the rotor and the concave is not detected by the sensor.

13. The apparatus of claim 9, further comprising programming instructions operable to instruct the one or more processors to rotate the rotor a selected amount as the concave is displaced towards the rotor.

14. The apparatus of claim 9, wherein the sensor is a knock sensor.

15. The apparatus of claim 9, further comprising programming instructions operable to instruct the one or more processors to lock the concave in position relative to the rotor when contact between the concave and the rotor is not detected by the sensor.

16. A system for automatically establishing a gap size between a concave and a rotor of a rotary crop processing system, the system comprising:
a rotor rotatably mounted within the rotary crop processing system;
a concave movable relative to rotor;
an actuator coupled to the concave, the actuator operable to displace the concave relative to the rotor; and
a sensor operable to detect contact between the concave and the rotor, the actuator configured to displace the concave towards the rotor until the sensor detects contact between the concave and the rotor and configured to displace the concave away from the rotor after the sensor detects contact between the concave and the rotor until the sensor does not detect contact between concave and the rotor.

17. The system of claim 16, wherein the actuator comprises a plurality of actuators coupled to the concave along a length of the concave, wherein each actuator of the plurality of actuators is configured to sequentially displace the concave towards and away from the concave while forming the selected gap size between the concave and the rotor.

18. The system of claim 16, wherein the sensor is a knock sensor.

19. The system of claim 16, wherein the rotor is configured to be rotated by a selected amount as the concave is displaced towards the rotor by the actuator.

20. The system of claim 16, further comprising a concave locking system operable to lock the concave in position relative to the rotor.

* * * * *